US010906438B2

(12) United States Patent
Mozurkewich et al.

(10) Patent No.: US 10,906,438 B2
(45) Date of Patent: Feb. 2, 2021

(54) INTEGRATED SECOND ROW LOAD FLOOR AIR MATTRESS

(71) Applicant: Ford Global Technologies, LLC, Dearborn, MI (US)

(72) Inventors: Kevin Mozurkewich, Livonia, MI (US); Marcos Silva Kondrad, Macomb, MI (US); Kevin Wayne Preuss, Berkley, MI (US); Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 15/631,748

(22) Filed: Jun. 23, 2017

(65) Prior Publication Data

US 2018/0370396 A1 Dec. 27, 2018

(51) Int. Cl.
*B60N 2/34* (2006.01)
*B60P 3/38* (2006.01)
*B60P 3/39* (2006.01)
*B60N 2/30* (2006.01)
*B60N 2/56* (2006.01)

(52) U.S. Cl.
CPC .......... *B60N 2/345* (2013.01); *B60N 2/3097* (2013.01); *B60N 2/5628* (2013.01); *B60P 3/38* (2013.01); *B60P 3/39* (2013.01)

(58) Field of Classification Search
CPC ...... A47C 17/80; B60N 2/345; B60N 2/3097; B60N 2/5628; B60P 3/39; B60P 3/38
See application file for complete search history.

(56) References Cited

U.S. PATENT DOCUMENTS

| 4,272,119 A | 6/1981 | Adams |
| 5,370,035 A | 12/1994 | Madden, Jr. |
| 6,273,810 B1 * | 8/2001 | Rhodes, Jr. ............... A47C 4/54 454/120 |
| 7,021,694 B1 | 4/2006 | Roberts et al. |
| 8,770,661 B2 * | 7/2014 | Kalergis ................. B60R 7/043 296/37.15 |
| 2005/0120477 A1 * | 6/2005 | Kennan ................... A47C 17/80 5/118 |
| 2011/0186560 A1 * | 8/2011 | Kennedy .............. B60N 2/5628 219/217 |
| 2019/0047445 A1 * | 2/2019 | Kim ......................... B60N 2/34 |

FOREIGN PATENT DOCUMENTS

| DE | 29503841 U1 * | 4/1995 | ............... A47C 7/74 |
| WO | WO-2004014689 A1 * | 2/2004 | ............. B60N 2/345 |

* cited by examiner

*Primary Examiner* — David R Hare
*Assistant Examiner* — Alexis Felix Lopez
(74) *Attorney, Agent, or Firm* — David L. Coppiellie; Price Heneveld LLP

(57) ABSTRACT

A seating assembly for a vehicle includes a seat operable between a lateral use position and a vertical storage position. A mattress is disposed below the seat when the seat is in the lateral use position and held in place by securing features. The mattress is operable between a deployed condition and a stowed condition. A fluid duct is disposed below a forward seat and in fluid communication with an HVAC system of the vehicle. The fluid duct is configured to move air into the mattress to affect the deployed condition of the mattress.

17 Claims, 7 Drawing Sheets

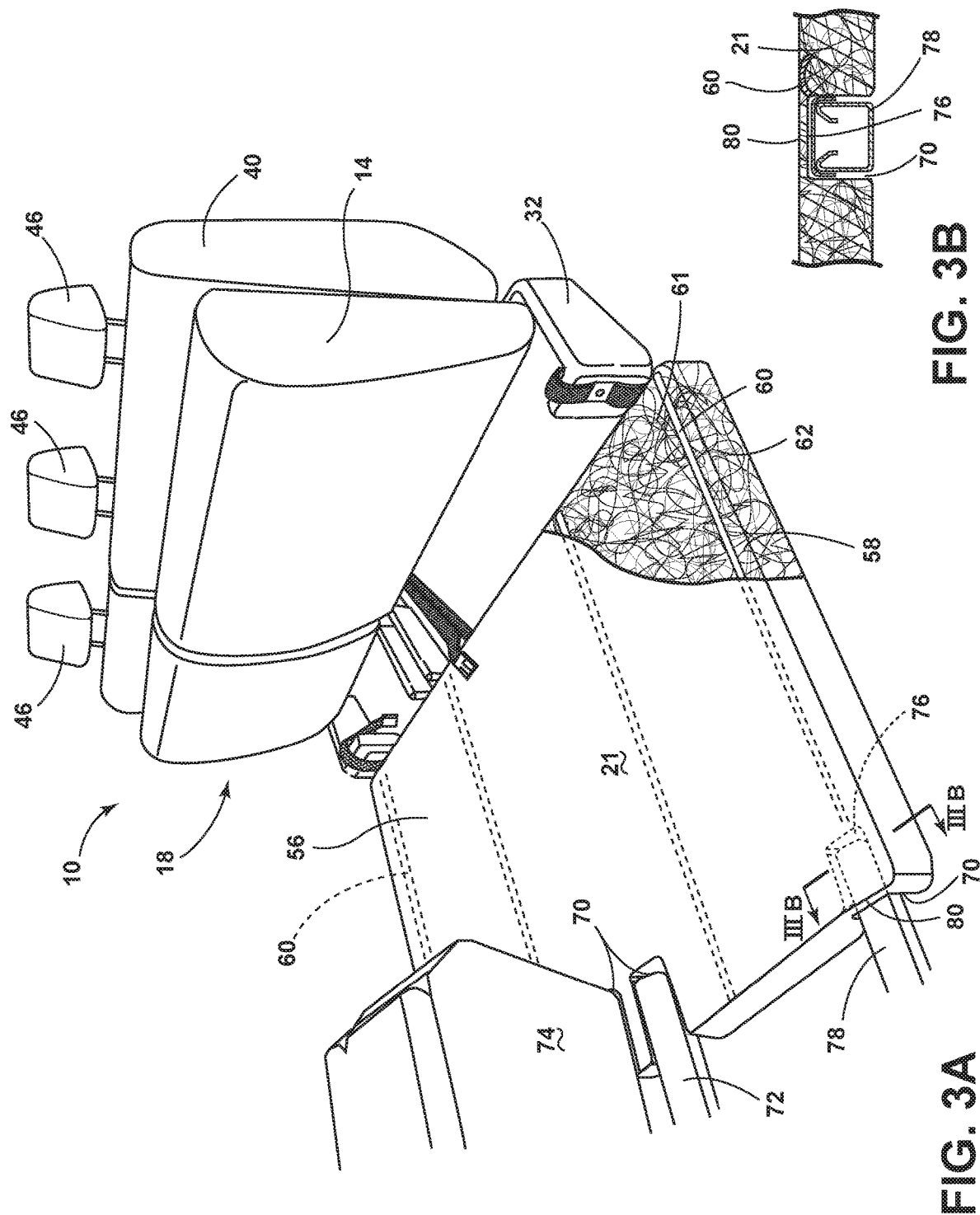

INTEGRATED SECOND ROW LOAD FLOOR AIR MATTRESS

FIELD OF THE DISCLOSURE

The present disclosure generally relates to an air mattress for a seating assembly, and more particularly to an integrated second row load floor air mattress for a seating assembly.

BACKGROUND OF THE DISCLOSURE

As transportation and lodging costs increase and the need to ship items over the road continues to expand, creative solutions to provide drivers with sleeping accommodations has also increased. The desire for luxury and comfort in many kinds of vehicles has steadily increased.

SUMMARY OF THE DISCLOSURE

According to one aspect of the present disclosure, a seating assembly for a vehicle includes a seat operable between a lateral use position and a vertical storage position. A mattress is disposed below the seat when the seat is in the lateral use position and held in place by securing features. The mattress is operable between a deployed condition and a stowed condition. A fluid duct is disposed below a forward seat and in fluid communication with an HVAC system of the vehicle. The fluid duct is configured to move air into the mattress to affect the deployed condition of the mattress.

According to another aspect of the present disclosure, a seating assembly includes a seat operable between lateral and vertical positions. A mattress is disposed below the seat and held in place by securing features. The mattress is operable between deployed and stowed conditions. A fluid duct is disposed below a forward seat and is in fluid communication with an HVAC system of a vehicle configured to move air into the mattress. A coupling assembly fluidly couples the mattress and fluid duct.

According to yet another aspect of the present disclosure, a vehicle mattress assembly includes a rearward seat operable between lateral and vertical positions. A deployable mattress is disposed below the rearward seat and is configured to be held in place by securing features. A fluid duct is disposed below a forward seat and is in fluid communication with an HVAC system of a vehicle. The fluid duct is configured to move air into the mattress to deploy the mattress. A foam matrix is disposed within the mattress.

According to still another aspect of the present disclosure, a vehicle seating assembly includes a mattress that is operable between a stored condition and a deployed condition. The mattress includes a thickness configured to support the weight of a user and provide a comfortable location for the user to sleep. In addition, the mattress includes a number of comfort features and features to expedite the deployment of the mattress for use. Some of these features are internal to the mattress, while others are external to the mattress and defined as part of the vehicle seating assembly.

Embodiments of the first aspect, the second aspect, and the third aspect of the present disclosure, as set forth in the preceding paragraphs, can include any one or a combination of the following features:

A valve is disposed on an outer wall of a mattress.
A coupling assembly fluidly couples the mattress with a fluid duct.
The coupling assembly includes a vent attachment head that extends into the fluid duct.
A retaining feature is configured to positively secure the vent attachment head with the fluid duct.
The mattress includes biasing members configured to bias the mattress to a rolled position when the mattress in the stowed condition.
A foam matrix is disposed within the mattress.
Cutouts are configured to accommodate feet of a seat.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3A is a front perspective view of a seating assembly of the present disclosure with a mattress in a deployed condition;

FIG. 3B is a partial front elevational cross-sectional view of a portion of a mattress assembly of the present disclosure;

DETAILED DESCRIPTION OF THE EMBODIMENTS

Figure 1:
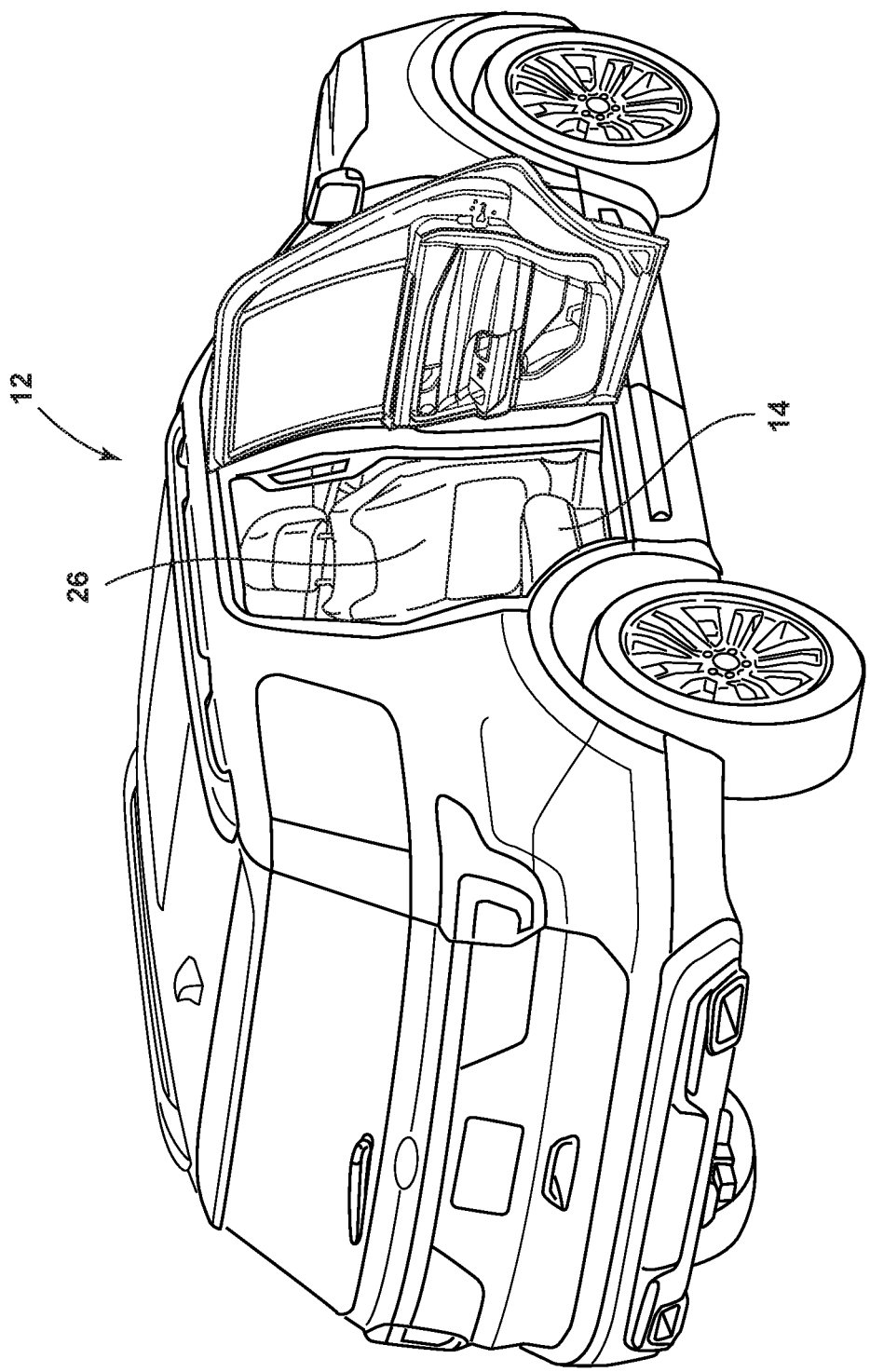
FIG. 1 is a rear perspective view of a vehicle of the present disclosure with an open rear door.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-5, reference numeral 10 generally designates a seating assembly for a vehicle 12 that includes a seat 14 operable between a lateral use position 16 and a vertical storage position 18. A mattress assembly 20 includes a mattress 21 disposed below the seat 14 when the seat 14 is in the lateral use position 16 and held in place by securing features 22. The mattress 21 is operable between a deployed condition and a stowed condition. A fluid duct 24 is disposed below a forward seat 26 and is in fluid communication with a heating, ventilation, and air conditioning (HVAC) system 28 of the vehicle 12. The fluid duct 24 is configured to move air into the mattress 21 to affect the deployed condition of the mattress 21.

With reference again to FIGS. 1 and 2A-2C, the seating assembly 10 may be used in any vehicle 12, such as a car, a truck, a van, etc. It is also contemplated that the concept set forth in this disclosure may be utilized between a front or forward seat of the vehicle 12 and a rear or rearward position of the vehicle 12. However, the concept could also be used in a trunk area of a sport utility vehicle (SUV) or between second and third row seating of a vehicle 12. The seating assembly 10, as illustrated, may be positioned on support brackets 32 or on rail slides to allow fore and aft movement of the seating assembly 10 relative to the vehicle 12. The fore and aft movement can be utilized to create additional space to accommodate the mattress 21. The seating assembly 10 may be adjusted vertically, forward and rearward, and may also include comfort settings located in the seat 14 or a seatback 40 operably coupled with the seat 14. The seatback 40 includes a lower lumbar region 42 and an upper thoracic region 44, as well as a head restraint 46 disposed above and operably coupled with the upper thoracic region 44. Stated differently, each of the components of the seatback 40 may be configured for adjustability to properly support various occupants of different sizes and shapes inside the vehicle 12. One example may be an actuatable lumbar support, which may include an inflatable bladder or mechanical support that can be adjusted based on user preferences. Alternatively, a spring system may also be used to support the lower back of an occupant.

Figure 2A:
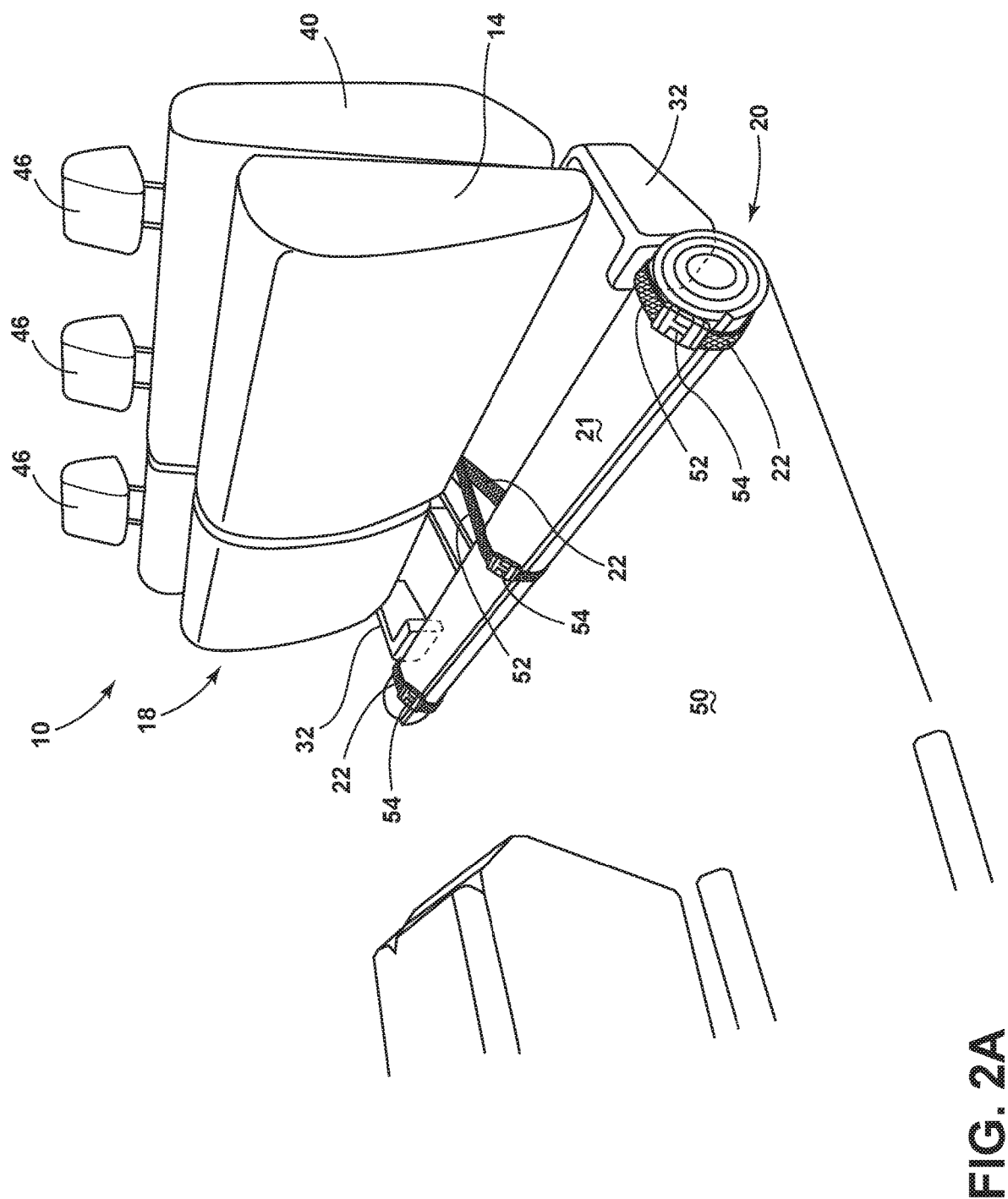
FIG. 2A is an enlarged front perspective view of a seating assembly of the present disclosure with a mattress in a stowed condition.
Figure 2B:
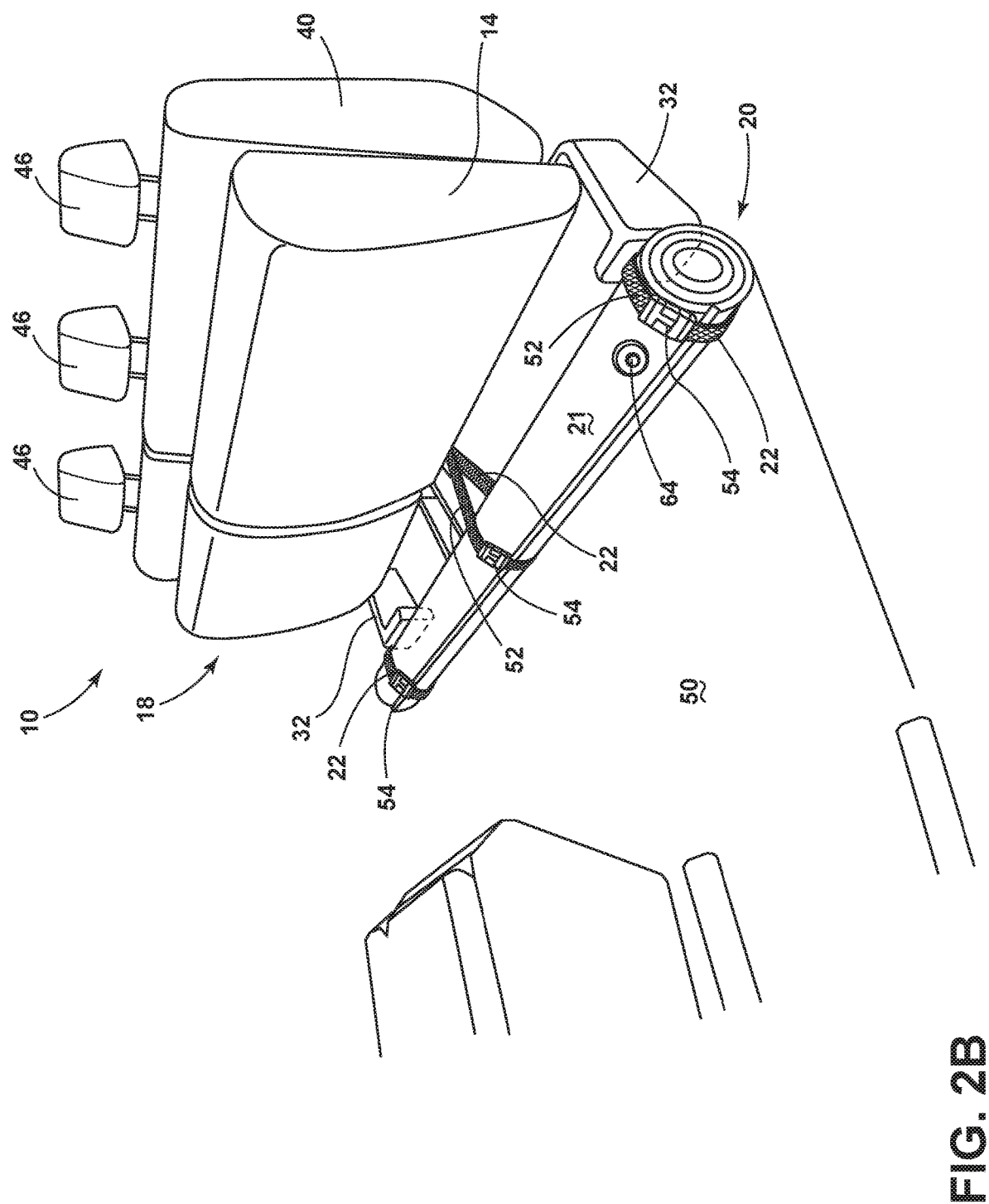
FIG. 2B is a front perspective view of the seating assembly of FIG. 2A with a seat rotated to a vertical orientation.
Figure 2C:
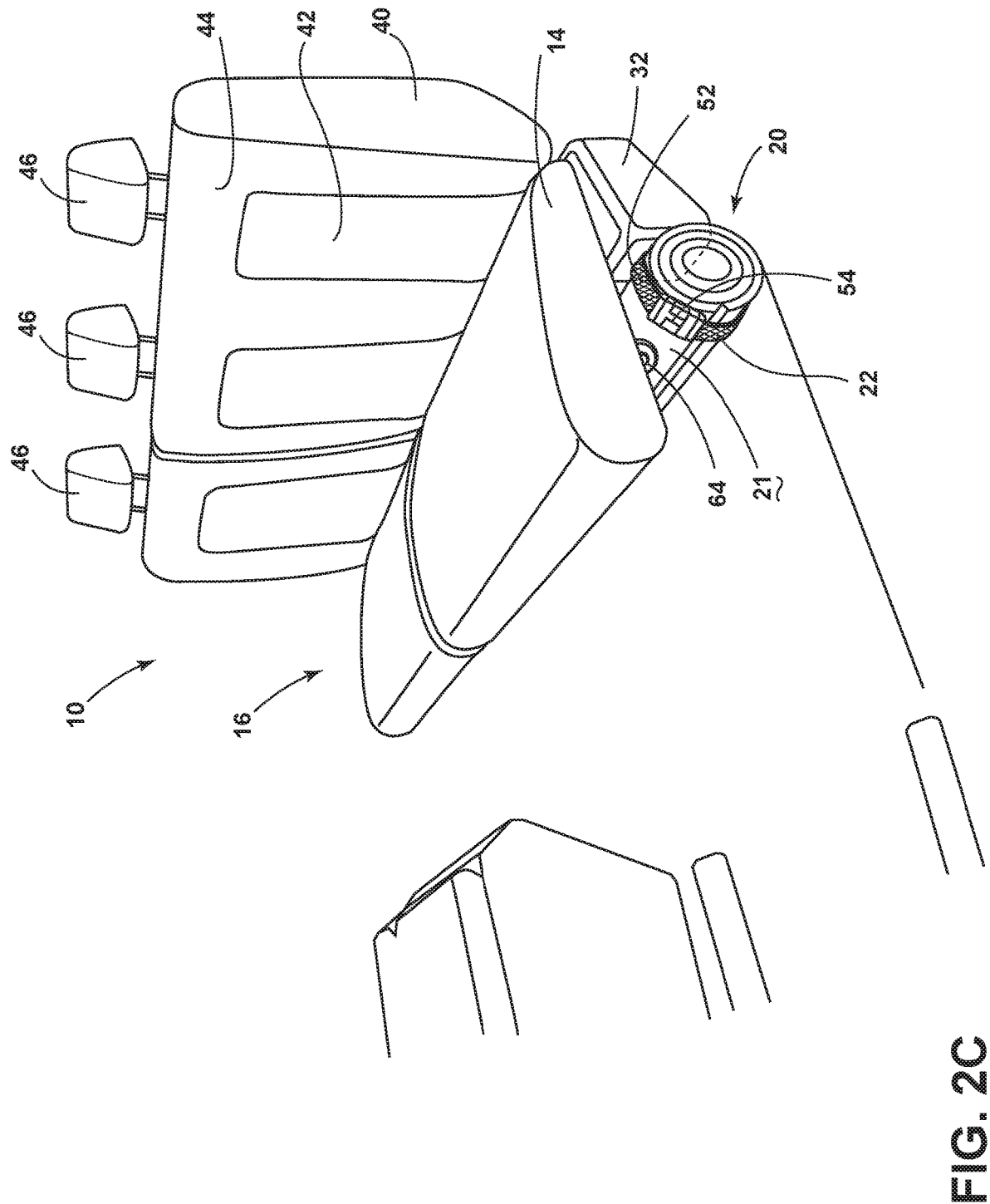
FIG. 2C is a front perspective view of a seating assembly of the present disclosure with a mattress in a stowed condition.

With reference again to FIGS. 2A-2C, the seat 14 of the seating assembly 10 is configured to accommodate seated passengers as well as cargo. Accordingly, as previously noted, the seat 14 is operable between the lateral use position 16 and the vertical storage position 18. When the seat 14 is in the vertical storage position 18, a floor cargo area 50 and the mattress 21 are generally exposed. As illustrated, the securing features 22 of the mattress 21 may include a variety of mechanical type devices configured to maintain the mattress 21 in the stowed condition. For example, the securing features 22 may include straps 52 constructed from a durable material, such as nylon, and which are flexible and include clasps 54 configured to engage, thereby maintaining the mattress 21 in the stowed condition. Securing alternatives to the clasps 54 may include Velcro®, snaps, magnetic couplers, etc. It will also be noted that the securing features 22 may be removably coupled, fixedly coupled, or not coupled at all to an interior of the vehicle 12. In the event the securing features 22 are secured to the vehicle 12, the mattress 21 (when in the stowed condition) will be maintained in position. Consequently, the mattress 21 is prohibited from rolling forward during travel. Alternatively, as shown in FIG. 2A, a central securing feature may be secured to a rear portion of the seating assembly 10, while securing features disposed on each end of the mattress 21 are not coupled with any portion of the vehicle 12. It will also be understood that the securing features 22 may be disposed directly on an external cover 56 of the mattress 21. For example, snap-fit mechanical fasteners, hook and loop fasteners, etc., may be disposed on certain portions of the mattress 21, such that when the mattress 21 is rolled into the stowed condition, the mattress 21 is held in place by the securing features 22. In this instance, it is generally contemplated that the mattress 21 (when in the stowed condition) may be held in place frictionally between the floor cargo area 50 and a bottom surface of the seat 14.

With reference again to FIGS. 2A-2C, as well as FIGS. 3A and 3B, the mattress 21 may be formed of any of a variety of materials and may be self-inflatable, or inflated by an external source. The external cover 56 of the mattress 21 generally defines an internal cavity 58 that fills with air when the mattress 21 is moving to the deployed condition and loses air when moving to the stowed condition. For example, the mattress 21 may include biasing members 60 disposed within the mattress 21 and which are configured to bias the mattress 21 to a rolled position when the mattress is in the stowed condition. The biasing members 60 are spring-like elongate members configured to extend across the mattress 21. The biasing members 60 may be sewn into or onto an inside surface of the external cover 56 or may float within the internal cavity 58. The biasing members 60 help move the mattress 21 to the deployed condition.

In use, a user simply disengages the securing features 22 and the mattress 21 will unroll on its own volition. Alternatively, or in conjunction with the biasing members 60, a multitude of strand-like members 61 may form a foam matrix 62 that may be disposed within the mattress 21. The foam matrix 62 may be formed into a woven or non-woven matrix that is elastically deformable. The foam matrix 62 is generally configured to expand the mattress 21 by pushing the external cover 56 outward. This results in air being drawn into the internal cavity 58. The foam matrix 62 may be an expandable foam matrix 62 that has elastic properties configured to expand once the securing features 22 have been disengaged. Accordingly, when the securing features 22 have been disengaged, the foam matrix 62 is free to expand, which results in the mattress 21 expanding to fit the floor cargo area 50 behind the forward seat 26 and in front of the seat 14 within the vehicle 12. In this instance, a valve 64 (FIGS. 2B and 2C) may be disposed on a wall of the mattress 21, which allows for air external to the mattress 21 to move into the mattress 21, allowing for expansion of the foam matrix 62. However, is also contemplated that the walls of the mattress 21 may be slightly air permeable such that once the securing features 22 have been disengaged, the mattress 21 can expand simply by drawing air through the walls of the mattress 21. In yet another construction, the mattress 21 is formed from an open cell or closed cell foam such that the size and thickness of the mattress 21 does not vary substantially when the mattress 21 is in the deployed condition or in the stowed condition. The mattress 21 is simply rolled up and maintains a general thickness regardless of being in the deployed condition or the stowed condition.

With reference again to FIGS. 3A and 3B, the mattress 21 may include recesses 70 generally constructed to complement features within the vehicle 12. For example, the recesses 70 may be configured to accommodate rail slides 72 of the forward seat 26 and/or a center console 74 of the vehicle 12. Accordingly, additional mattress space is afforded to a user. It is also contemplated that the mattress 21 may include a forward edge with a receiver 76 configured to extend over items that are permanently affixed to a floor of the vehicle 12 (such as an outer rail slide 78). For example, the receiver 76 may be configured to engage a top side of the outer rail slide 78 of the forward seat 26. In this instance, the receiver 76 extends over the outer rail slide 78 with a thin profile cushion 80 extending over the receiver 76. This construction results in additional mattress space provided to the user without the user noticing heightened discomfort at the outer rail slide 78.

Figure 4:
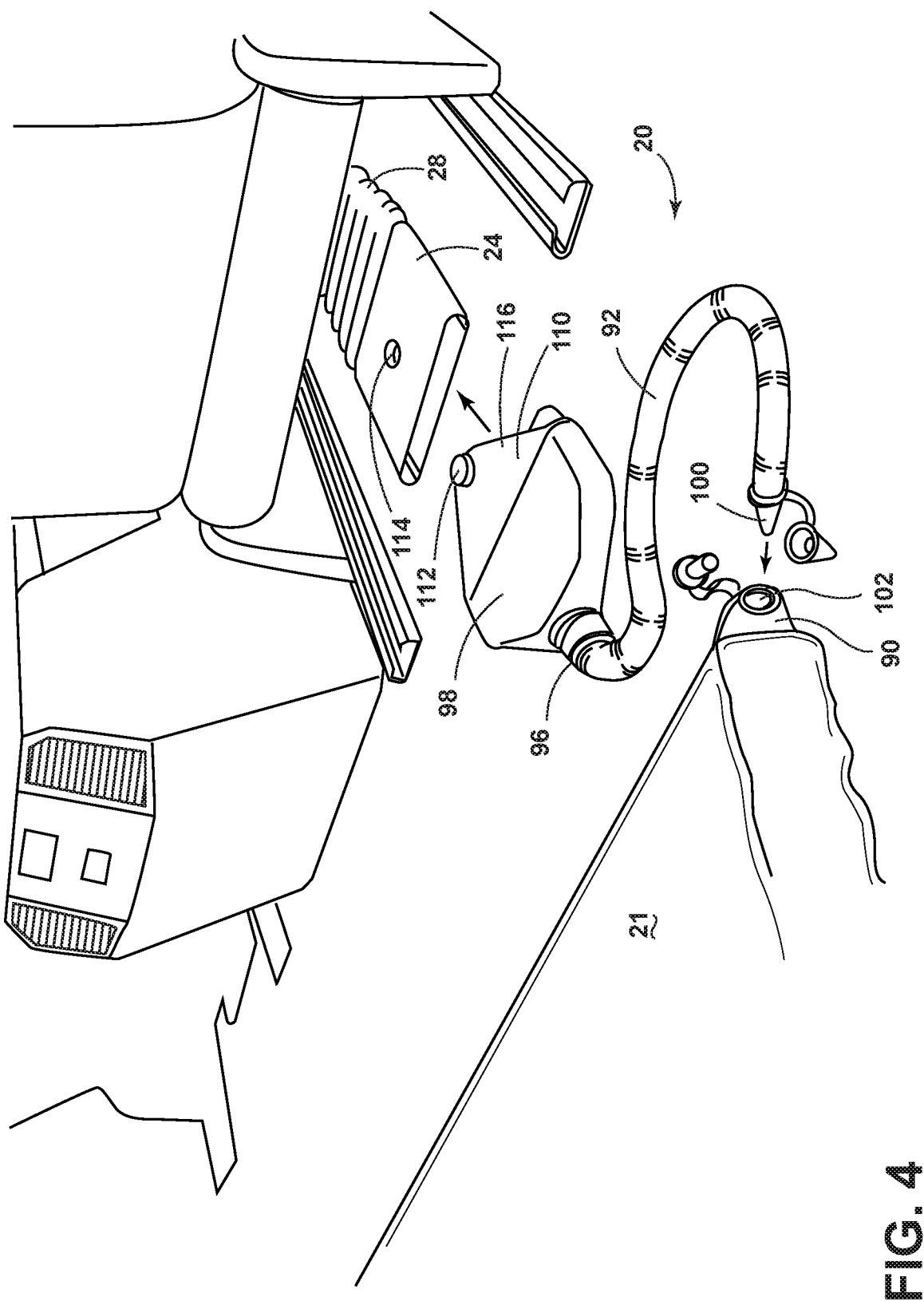
FIG. 4 is a perspective view of a mattress assembly of the present disclosure with a disconnected air hose.
Figure 5:
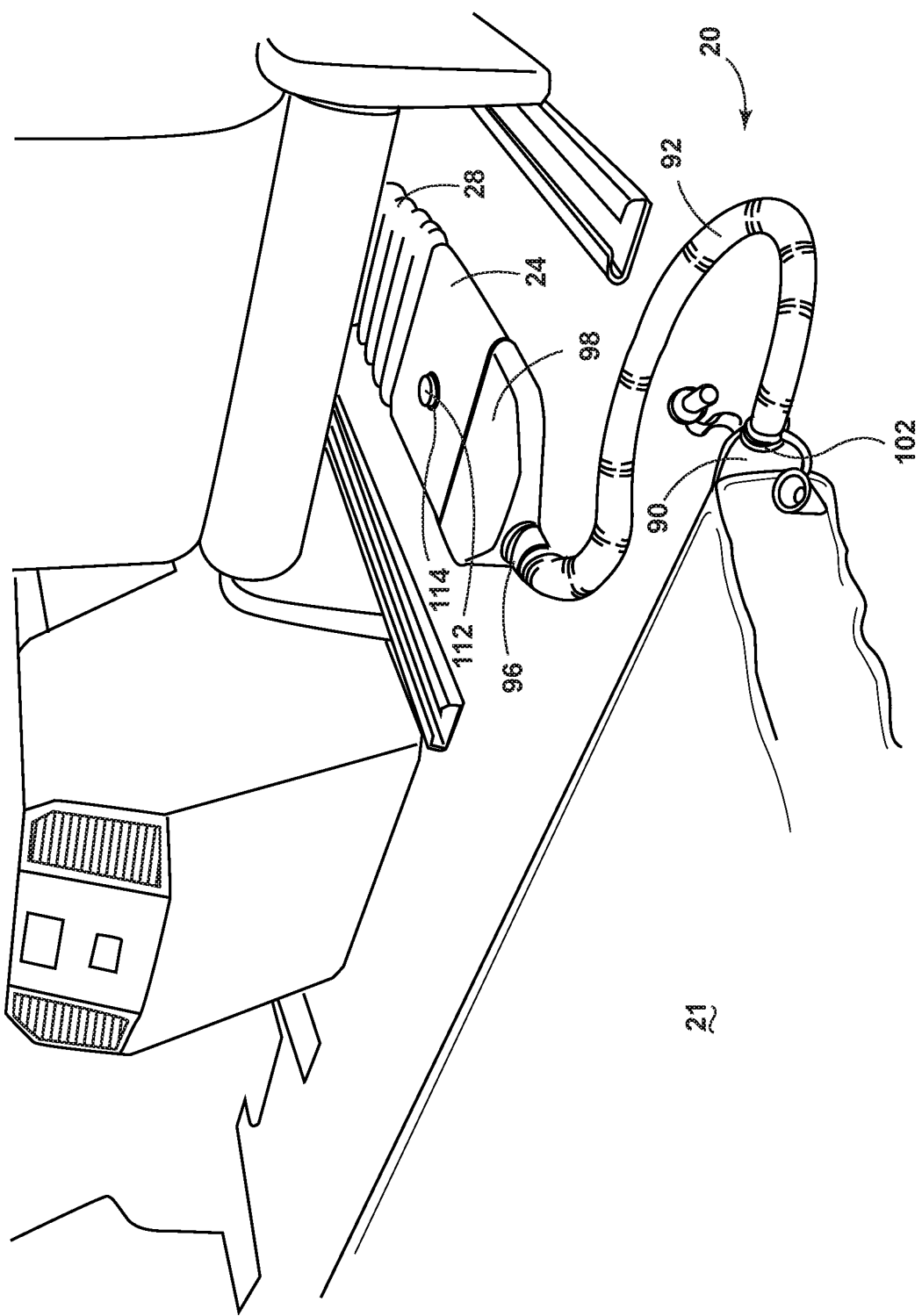
FIG. 5 is a rear perspective view of the mattress assembly of FIG. 4 with a connected air hose.

With reference now to FIGS. 4 and 5, in an alternate construction, the mattress 21 includes a valve assembly 90 disposed on the wall of the mattress 21. An adapter hose 92 is configured to supply air from the fluid duct 24 that is in communication with the HVAC system 28 within the vehicle 12. The adapter hose 92 includes a first end 96 with a widened mouth 98 configured to engage the ductwork 94 of the HVAC system 28 and a smaller valve engagement end 100 having a valve or tapered distal end configured to press against a valve inlet 102 of the valve assembly 90 disposed within the mattress 21. In addition, the valve engagement end 100 may include a securing feature that is configured to maintain secure engagement between the valve engagement end 100 and the valve inlet 102 of the mattress 21. The first end 96 of the adapter hose 92 includes the widened mouth 98 and a securing feature 110 configured to maintain engagement with the fluid duct 24 of the HVAC system 28 of the vehicle 12. In the illustrated embodiment, the securing feature 110 includes an upwardly extending knob 112 configured to engage an aperture 114 defined in the fluid duct 24. The knob 112 is disposed on a top flange 116, which is inserted into the fluid duct 24 of the HVAC system 28. Once the first end 96 of the adapter hose 92 has been coupled with the fluid duct 24 of the HVAC system 28, the HVAC system 28 can be activated, thereby filling the mattress 21.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly for a vehicle, comprising:
   a rearward seat operable between a lateral use position and a vertical storage position;
   a mattress disposed below the rearward seat when the rearward seat is in the lateral use position and held in place by securing features, wherein the mattress is operable between a deployed condition and a stowed condition; and
   cutouts defined by the mattress and configured to receive and at least partially cover items on a floor of said vehicle;
   a fluid duct disposed below a forward seat and in fluid communication with an HVAC system of the vehicle, the fluid duct configured to move air into the mattress to affect the deployed condition of the mattress.

2. The seating assembly of claim 1, further comprising:
   a valve disposed on an outer wall of the mattress.

3. The seating assembly of claim 1, further comprising:
   a coupling assembly that fluidly couples the mattress with the fluid duct.

4. The seating assembly of claim 3, wherein the coupling assembly includes a vent attachment head that extends into the fluid duct.

5. The seating assembly of claim 4, wherein a retaining feature is configured to positively secure the vent attachment head with the fluid duct.

6. The seating assembly of claim 1, wherein the mattress includes biasing members configured to bias the mattress to a rolled position when the mattress is in the stowed condition.

7. The seating assembly of claim 1, wherein a foam matrix is disposed within the mattress.

8. A seating assembly, comprising:
   a rearward seat operable between lateral and vertical positions;
   a mattress disposed below the rearward seat and held in place by securing features, wherein the mattress is operable between deployed and stowed conditions, and wherein the mattress includes biasing members configured to bias the mattress to the deployed condition when the mattress is in the stowed condition;

a fluid duct disposed below a forward seat and in fluid communication with an HVAC system of a vehicle and configured to move air into the mattress; and a coupling assembly fluidly coupling the mattress and fluid duct.

9. The seating assembly of claim 8, further comprising:

a valve disposed on an outer wall of the mattress.

10. The seating assembly of claim 8, wherein the coupling assembly includes a vent attachment head that extends into the fluid duct.

11. The seating assembly of claim 10, wherein a retaining feature is configured to positively secure the vent attachment head with the fluid duct.

12. The seating assembly of claim 8, wherein a foam matrix is disposed within the mattress.

13. The seating assembly of claim 8, further comprising:

cutouts configured to accommodate feet of the rearward seat.

14. A vehicle mattress assembly, comprising:

a rearward seat operable between lateral and vertical positions;

a deployable mattress disposed below the rearward seat and configured to be held in place by securing features;

a fluid duct disposed below a forward seat and in fluid communication with an HVAC system of a vehicle, the fluid duct configured to move air into the mattress to deploy the mattress;

an adapter hose that includes a widened mouth and a coupling feature configured to maintain engagement with the fluid duct; and a foam matrix disposed within the mattress.

15. The vehicle mattress assembly of claim 14, further comprising:

a valve disposed on an outer wall of the mattress.

16. The vehicle mattress assembly of claim 14, wherein the coupling feature is one of a knob and an aperture configured to positively secure the widened mouth with the fluid duct.

17. The vehicle mattress assembly of claim 14, wherein the mattress includes biasing members configured to bias the mattress to a deployed condition when the mattress is in a stowed condition.

* * * * *